United States Patent
Kaviani Baghbaderani et al.

(10) Patent No.: US 12,340,586 B2
(45) Date of Patent: Jun. 24, 2025

(54) VIDEO SEMANTIC SEGMENTATION WITH BIDIRECTIONAL FEATURE PROPAGATION AND ATTENTION-BASED FEATURE CORRECTION

(71) Applicant: Samsung Electronics Co., Ltd., Suwon-si (KR)

(72) Inventors: Razieh Kaviani Baghbaderani, Rockville, MD (US); Yuanxin Li, San Diego, CA (US); Shuangquan Wang, San Diego, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 474 days.

(21) Appl. No.: 17/843,949

(22) Filed: Jun. 17, 2022

(65) Prior Publication Data

US 2023/0115081 A1 Apr. 13, 2023

Related U.S. Application Data

(60) Provisional application No. 63/254,051, filed on Oct. 8, 2021.

(51) Int. Cl.
*G06V 20/40* (2022.01)
(52) U.S. Cl.
CPC ............. *G06V 20/49* (2022.01); *G06V 20/46* (2022.01)
(58) Field of Classification Search
CPC ........ G06V 20/49; G06V 20/46; G06V 20/70; G06V 20/41; G06V 10/26; G06V 10/82; G06T 7/11; G06T 2207/10016
See application file for complete search history.

(56) References Cited

U.S. PATENT DOCUMENTS

| | | | |
|---|---|---|---|
| 10,152,627 B2 | 12/2018 | Wei et al. | |
| 10,528,821 B2 | 1/2020 | Carlson et al. | |
| 10,609,284 B2 | 3/2020 | Kang et al. | |
| 11,151,391 B2 | 10/2021 | Viswanathan | |
| 2019/0294881 A1* | 9/2019 | Polak | G06V 10/454 |
| 2020/0134827 A1 | 4/2020 | Saha et al. | |
| 2021/0319232 A1 | 10/2021 | Perazzi et al. | |
| 2021/0326638 A1 | 10/2021 | Lee et al. | |
| 2021/0360252 A1* | 11/2021 | Li | H04N 19/172 |
| 2023/0039867 A1* | 2/2023 | Li | G06N 3/04 |

\* cited by examiner

*Primary Examiner* — Christopher M Brandt
(74) *Attorney, Agent, or Firm* — Renaissance IP Law Group LLP

(57) ABSTRACT

A system and a method that provide video semantic segmentation are disclosed herein. A first frame of a sequence of video frames is semantically segmented to obtain at least one first semantic feature of the first frame. A second frame of the sequence is semantically segmented to obtain at least one second semantic feature of the second frame in which the second frame is subsequent to the first frame. A third frame of the sequence is semantically segmented to obtain at least one third semantic feature in which the third frame is subsequent to the second frame and also being subsequent to the first frame by a first predetermined number of consecutive frames. The at least one first semantic feature, the at least one second semantic feature and the at least one third semantic feature are combined to form at least one fourth semantic feature for the second frame.

13 Claims, 7 Drawing Sheets

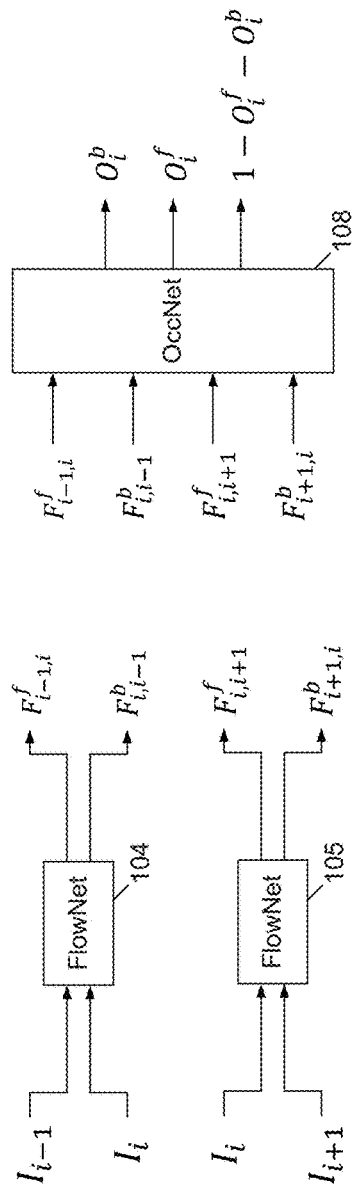
FIG. 2
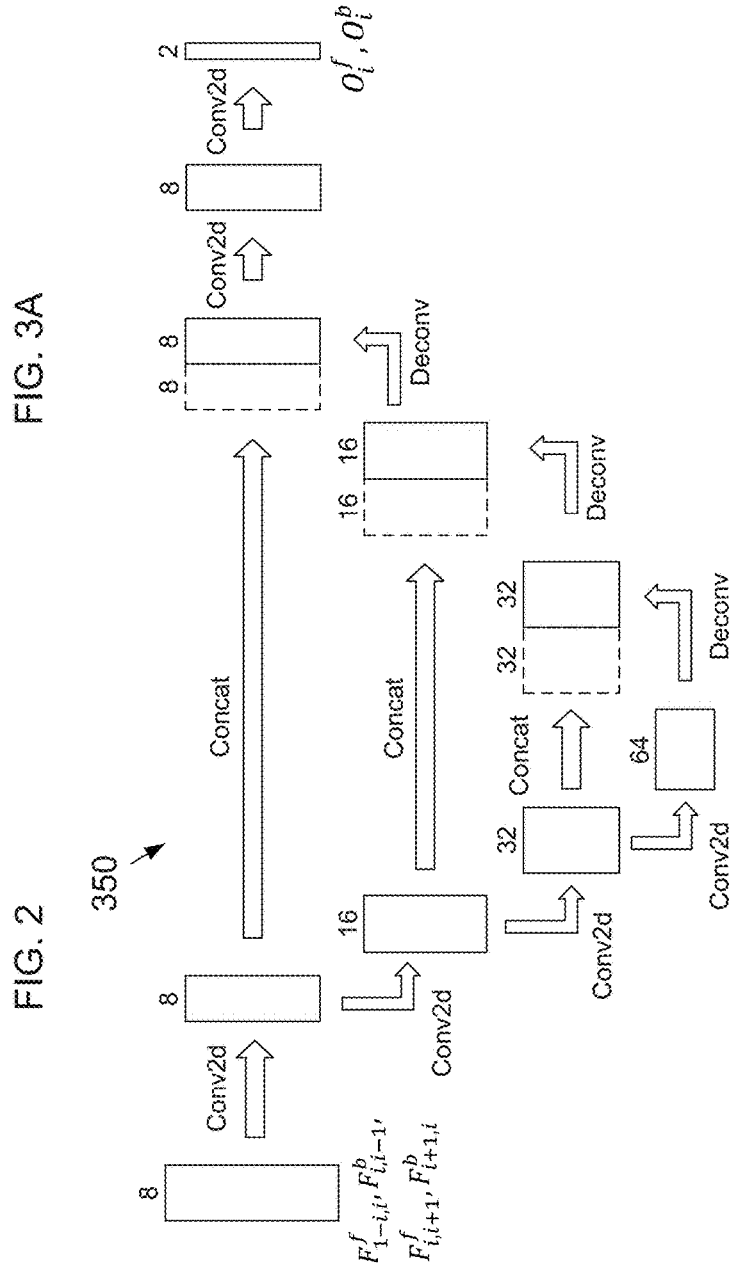
FIG. 3A
FIG. 3B

VIDEO SEMANTIC SEGMENTATION WITH BIDIRECTIONAL FEATURE PROPAGATION AND ATTENTION-BASED FEATURE CORRECTION

CROSS-REFERENCE TO RELATED APPLICATIONS

This application claims the priority benefit under 35 U.S.C. § 119(e) of U.S. Provisional Patent Application Ser. No. 63/254,051, filed on Oct. 8, 2021, the disclosure of which is incorporated herein by reference in its entirety.

TECHNICAL FIELD

The subject matter disclosed herein relates to video semantic segmentation. More particularly, the subject matter disclosed herein relates to a video semantic-segmentation system and method that uses bidirectional feature propagation and attention-based feature correction based on learned occlusion maps.

BACKGROUND

Video semantic segmentation is a classic Computer Vision problem that involves converting an input video into a corresponding sequence of masks having regions of interest that have been highlighted and classified. More specifically, video semantic segmentation is a process of classifying each pixel in each frame of a video as belonging to a particular object class. Conducting video semantic segmentation on a per-frame basis may not be an acceptable approach based on a high computation cost. In addition to segmentation accuracy per frame, temporal coherence is another crucial aspect of video semantic segmentation that may not be best handled by per-frame image semantic segmentation methods. In order to achieve good performance for both segmentation accuracy and temporal coherence, a process may use temporal information existing in neighboring frames when performing segmentation on a given frame in a video. Content continuity in consecutive frames may be advantageously used to perform flow-based feature propagations; however, results may suffer from distortions due to inaccuracies in the estimated optical flow.

SUMMARY

An example embodiment provides a method to provide video semantic segmentation in which the method may include: semantically segmenting, by a first image semantic-segmentation network, a first frame of a sequence of video frames to obtain at least one first semantic feature of the first frame; semantically segmenting, by a second image semantic-segmentation network, a second frame of the sequence of video frames to obtain at least one second semantic feature of the second frame, the second frame being subsequent to the first frame; semantically segmenting, by a third image semantic-segmentation network, a third frame of the sequence of video frames to obtain at least one third semantic feature of the third frame, the third frame being subsequent to both the first frame and the second frame according to a predetermined number of consecutive frames; and generating, by a combining network, at least one fourth semantic feature of the second frame based on the at least one first semantic feature, the at least one second semantic feature and the at least one third semantic feature. In one embodiment, the predetermined number of consecutive frames may include a fixed number of multiple consecutive frames, the first frame may be a frame at a beginning of the fixed number of multiple consecutive frames, the third frame may be at an end of the fixed number of multiple consecutive frames, the second frame may be a single frame in a middle of the fixed number of multiple consecutive frames between the first frame and the third frame, and the first frame and the third frame may be key frames. In another embodiment, the first image semantic-segmentation network may be a deeper neural network than the second image semantic-segmentation network, and the third image semantic-segmentation network may be a neural network that is deeper than the second image semantic-segmentation network. In still another embodiment, the method may further include propagating the at least one first semantic feature toward the second frame in a frame-by-frame manner to obtain at least one first propagated semantic feature; and propagating the at least one third semantic feature toward the second frame in a frame-by-frame manner to obtain at least one second propagated semantic feature. In yet another embodiment, the method may further include determining, by a first optical flow network, at least one first forward optical flow from a fourth frame of the sequence of video frames to the second frame and at least one first backward optical flow from the second frame to the fourth frame, the fourth frame being between the first frame and the second frame, and the fourth frame being immediately consecutive to the second frame; and determining, by a second optical flow network, at least one second forward optical flow from the second frame to a fifth frame of the sequence of video frames and at least one second backward optical flow from the fifth frame to the second frame, the fifth frame being between the second frame and the third frame, and the fifth frame being immediately consecutive to the second frame. In one embodiment, the method may further include propagating the at least one first semantic feature toward the second frame in a frame-by-frame manner to obtain at least one first propagated semantic feature; propagating the at least one third semantic feature toward the second frame in a frame-by-frame manner to obtain at least one second propagated semantic feature; determining, by a first occlusion network, at least one first occlusion map from the fourth frame to the second frame and at least one second occlusion map from the fifth frame to the second frame based, at least in part, on the at least one first forward optical flow, the at least one first backward optical flow, the at least one second forward optical flow and the at least one second backward optical flow; and generating at least one third occlusion map for the second frame based on the at least one first occlusion map and the at least one second occlusion map. In another embodiment, the method may further include generating, by the combining network, a semantically segmented frame for the second frame based on the at least one first propagated semantic feature and the at least one first occlusion map, the at least one second propagated semantic feature and the at least one second occlusion map, and the at least one second semantic feature for the second frame and at least one third occlusion map for the second frame, by multiplying by element-wise multiplication the at least one first propagated semantic feature and the at least one first occlusion map to obtain at least one first weighted semantic feature; multiplying by element-wise multiplication the at least one second propagated semantic feature and the at least one second occlusion map to obtain at least one second weighted semantic feature; multiplying by element-wise multiplication the at least one second semantic feature and at least one third occlusion map to obtain at least one third weighted semantic feature; and multiplying by element-wise summation the at least one first weighted semantic feature, the at least one second weighted semantic feature and the at least one third weighted semantic feature.

An example embodiment provides a method to estimate occlusion regions in a sequence of video frames that may include: determining, by a first optical flow network, at least one first forward optical flow from a first frame to a second frame and at least one first backward optical flow from the second frame to the first frame, the first frame temporally preceding the second frame and the second frame being immediately consecutive to the first frame; and determining, by a second optical flow network, at least one second forward optical flow from the second frame to a third frame and at least one second backward optical flow from the third frame to the second frame, the second frame temporally preceding the third frame and the third frame being immediately consecutive to the second frame. In one embodiment, the method may further include determining, by a first occlusion network, at least one first occlusion map from the first frame to the second frame and at least one second occlusion map from the third frame to the second frame based, at least in part, on the at least one first forward optical flow, the at least one first backward optical flow, the at least one second forward optical flow and the at least one second backward optical flow; and generating, by a combining network, at least one third occlusion map for the second frame based on the at least one first occlusion map and the at least one second occlusion map. In another embodiment, the method may further include semantically segmenting a fourth frame of the sequence of video frames by a first image semantic-segmentation network to obtain at least one first semantic feature of the fourth frame, the fourth frame temporally preceding the second frame; semantically segmenting the second frame by a second image semantic-segmentation network to obtain at least one second semantic feature of the second frame, the second frame being subsequent to the fourth frame; semantically segmenting a fifth frame of the sequence of video frames by a third image semantic-segmentation network to obtain at least one third semantic feature of the fifth frame, the fifth frame being subsequent to the second frame and also being subsequent to the fourth frame by a first predetermined number of consecutive frames; and generating, by the combining network, at least one fourth semantic feature of the second frame based on the at least one first semantic feature, the at least one second semantic feature and the at least one third semantic feature. In still another embodiment, the first predetermined number of consecutive frames may include a fixed number of multiple consecutive frames, the fourth frame may be at a beginning of the fixed number of multiple consecutive frames, the fifth frame may be at an end of the fixed number of multiple consecutive frames, the second frame may be a single frame in a middle of the fixed number of multiple consecutive frames between the fourth frame and the fifth frame, and the fourth frame and the fifth frame may be key frames. In yet another embodiment, the first image semantic-segmentation network may be a deeper neural network than the second image semantic-segmentation network, and the third image semantic-segmentation network may be a neural network that is deeper than the second image semantic-segmentation network. In one embodiment, the method may further include propagating the at least one first semantic feature toward the second frame in a frame-by-frame manner to obtain at least one first propagated semantic feature; and propagating the at least one third semantic feature toward the second frame in a frame-by-frame manner to obtain at least one second propagated semantic feature. In another embodiment, the method may further include generating, by the combining network, a semantically segmented frame for the second frame based on the at least one first propagated semantic feature and the at least one first occlusion map, the at least one second propagated semantic feature and the at least one second occlusion map, and the at least one second semantic feature for the second frame and at least one third occlusion map for the second frame, by multiplying by element-wise multiplication the at least one first propagated semantic feature and the at least one first occlusion map to obtain at least one first weighted semantic feature; multiplying by element-wise multiplication the at least one second propagated semantic feature and the at least one second occlusion map to obtain at least one second weighted semantic feature; multiplying by element-wise multiplication the at least one second semantic feature and at least one third occlusion map to obtain at least one third weighted semantic feature; and multiplying by element-wise summation the at least one first weighted semantic feature, the at least one second weighted semantic feature and the at least one third weighted semantic feature.

An example embodiment provides a system to provide video semantic segmentation that may include a first semantic-segmentation network, a second semantic-segmentation network, a third semantic-segmentation network, and a combining network. The first semantic-segmentation network may be configured to semantically segment a first frame of a predetermined number of consecutive video frames to obtain at least one first semantic feature of the first frame. The second semantic-segmentation network may be configured to semantically segment a second frame of the sequence of video frames to obtain at least one second semantic feature of the second frame, the second frame being subsequent to the first frame. The third semantic-segmentation network may configured to semantically segment a third frame of the sequence of video frames to obtain at least one third semantic feature of the third frame, the third frame being subsequent to the second frame and also being subsequent to the first frame by a first predetermined number of consecutive frames. The combining network may be configured to generate at least one fourth semantic feature of the second frame based on the at least one first semantic feature, the at least one second semantic feature and the at least one third semantic feature. In one embodiment, the first predetermined number of consecutive frames may include a fixed number of consecutive frames, the first frame may be at a beginning of the fixed number of consecutive frames, the third frame may be at an end of the fixed number of consecutive frames, the second frame may be a single frame in a middle of the fixed number of consecutive frames between the first frame and the third frame, and the first frame and the third frame may be key frames. In another embodiment, the system may be further configured to: propagate the at least one first semantic feature toward the second frame in a frame-by-frame manner to obtain at least one first propagated semantic feature; and propagate the at least one third semantic feature toward the second frame in a frame-by-frame manner to obtain at least one second propagated semantic feature. In still another embodiment, the system may further include a first optical flow network that may be configured to determine at least one first forward optical flow from a fourth frame to the second frame and at least one first backward optical flow from the second frame to the fourth frame, the fourth frame being between the first frame and the second frame, and the fourth frame being immediately consecutive to the second frame; and a second optical flow network that may be configured to determine at least one second forward optical flow from the second frame to a fifth frame and at least one second backward optical flow from the fifth frame to the second frame, the fifth frame being between the second frame and the third frame, and the fifth frame being immediately consecutive to the second frame. In yet another embodiment, the system may further include a first occlusion network that may be configured to determine at least one first occlusion map from the fourth frame to the second frame and at least one second occlusion map from the fifth frame to the second frame based, at least in part, on the at least one first forward optical flow, the at least one first backward optical flow, the at least one second forward optical flow and the at least one second backward optical flow, and the combining network may be further configured to generate at least one third occlusion map for the second frame based on the at least one first occlusion map and the at least one second occlusion map. In one embodiment, the system may be further configured to: propagate the at least one first semantic feature toward the second frame in a frame-by-frame manner to obtain at least one first propagated semantic feature; and propagate the at least one third semantic feature toward the second frame in a frame-by-frame manner to obtain at least one second propagated semantic feature, and wherein the combining network is further configured to generate a semantically segmented frame for the second frame based on the at least one first propagated semantic feature and the at least one first occlusion map, the at least one second propagated semantic feature and the at least one second occlusion map, and the at least one second semantic feature for the second frame and at least one third occlusion map for the second frame by multiplying by element-wise multiplication the at least one first propagated semantic feature and the at least one first occlusion map to obtain at least one first weighted semantic feature; multiplying by element-wise multiplication the at least one second propagated semantic feature and the at least one second occlusion map to obtain at least one second weighted semantic feature; multiplying by element-wise multiplication the at least one second semantic feature and at least one third occlusion map to obtain at least one third weighted semantic feature; and multiplying by element-wise summation the at least one first weighted semantic feature, the at least one second weighted semantic feature and the at least one third weighted semantic feature.

BRIEF DESCRIPTION OF THE DRAWING

In the following section, the aspects of the subject matter disclosed herein will be described with reference to exemplary embodiments illustrated in the figure, in which:

FIG. 2 depicts input frames and output optical flows generated by FlowNets according to the subject matter disclosed herein;

FIG. 3A depicts four estimated optical flows may be input into the occlusion network OccNet to estimate regions that may contain distortions due to occlusions during the propagation process according to the subject matter disclosed herein;

FIG. 3B depicts an example U-Net shape structure that may be used to receive four optical flows from three consecutive frames as inputs and that may output estimates of occlusion maps according to the subject matter disclosed herein;

DETAILED DESCRIPTION

Figure 1:
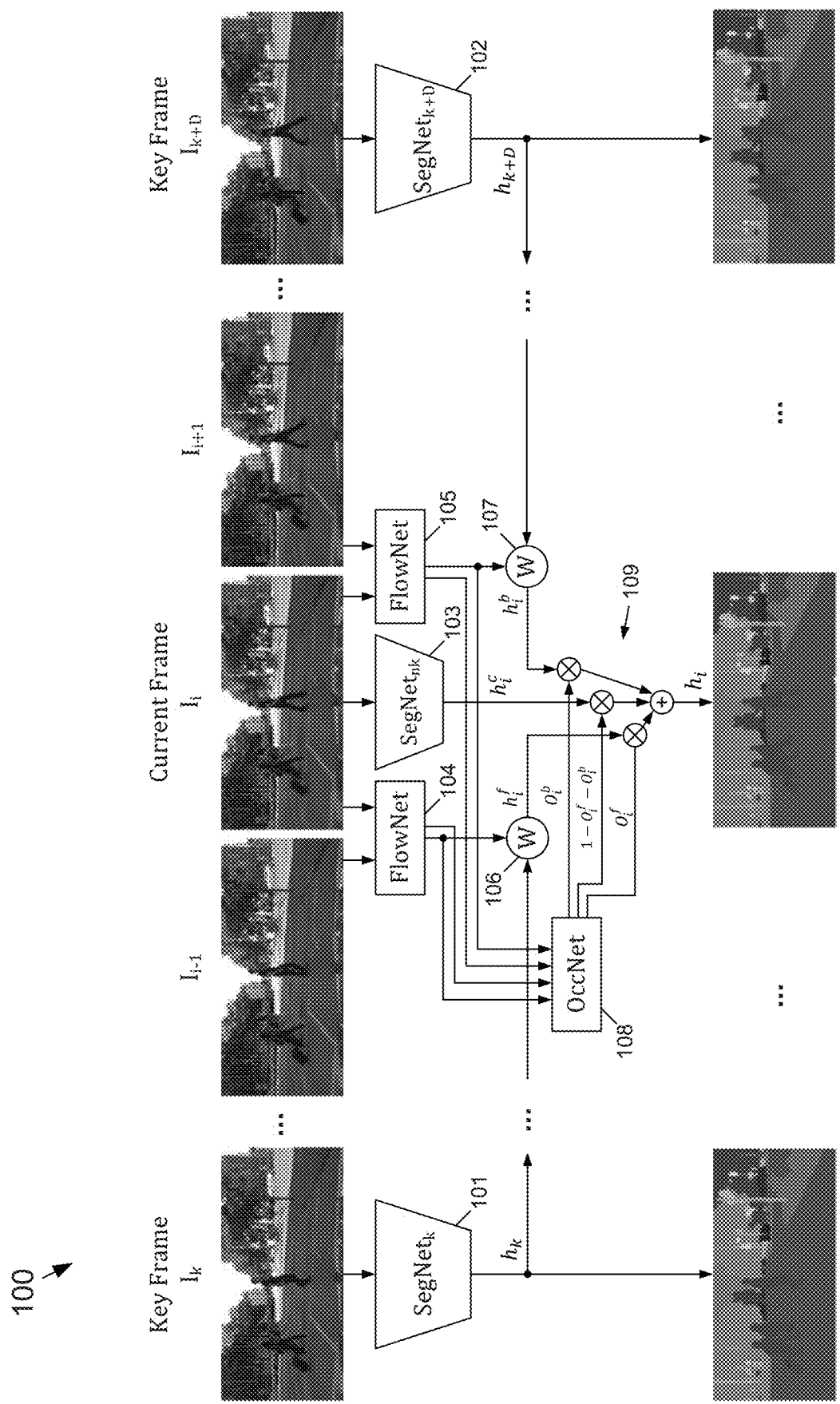
FIG. 1 depicts an example embodiment of a system framework according to the subject matter disclosed herein.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-a-chip (SoC), an assembly, and so forth.

The subject matter disclosed herein provides a system and a method that achieves high segmentation accuracy and temporal consistency in video semantic segmentation at a low computational cost by using bidirectional feature propagation and attention-based feature correction. The bidirectional feature propagation aspect propagates features of key frames in both forward and backward temporal directions toward non-key frames between key frames. The attention-based feature correction aspect refines propagated features using features obtained from a current frame by a lightweight network based on occlusion maps learned by a occlusion network taking into consideration of occlusion detection in both forward and backward directions.

Several traditional key-frame-based video semantic-segmentation techniques use content continuity between frames and propagate high-level features extracted at a key frame in one direction to other time steps. The traditional propagation process may include a misalignment caused by motion between frames. For example, a Deep Feature Flow (DFF) technique uses an optical flow to warp high-level features from a key frame to the next frames. A Corrective Fusion Network, which is named Accel, updates warped features using low-level features extracted from a current frame. In contrast to traditional approaches, the subject matter disclosed herein may use content continuity between frames to estimate semantic segmentation for non-key frames in both temporally forward and backward directions and may refine distortions using a lightweight network, thereby providing a sequence of quality segmentation maps having a low computation cost.

FIG. 1 depicts an example embodiment of a system framework 100 according to the subject matter disclosed herein. The system framework 100 includes a bidirectional feature propagation framework and an attention-based feature correction mechanism. The bidirectional feature propagation framework propagates features from key frames toward non-key frames in both temporally forward and backwards directions. The attention-based feature correction mechanism fuses the forward and backward propagated features as well as the ones extracted from the current frame based on the occlusion maps which are learned by an occlusion network taking into consideration of occlusion detection in both forward and backward directions.

Referring to FIG. 1, the bidirectional feature-propagation framework 100 includes a first image sematic-segmentation network (SegNet$_k$) 101, a second image sematic-segmentation network (SegNet$_{k+D}$) 102, a third image semantic-segmentation network (SegNetn$_k$) 103, a first optical flow network (FlowNet) 104, a second optical flow network (FlowNet) 105, a first warp operation (W) circuit 106, and a second warp operation (W) circuit 107. The attention-based feature correction mechanism includes an occlusion network (OccNet) 108. The outputs of the bidirectional feature-propagation framework and the occlusion network are combined in a combining network 109. The various components forming the bidirectional feature-propagation framework 100 may be implemented as one or more modules, networks, circuits and/or discrete components.

Each video frame of the sequence of video frames depicted along the top of FIG. 1 may be treated as a key frame or as a non-key frame. A key frame may be directly applied to the image semantic-segmentation network SegNet$_k$ 101 or SegNet$_{k+D}$ 102 to obtain semantic-segmentation results (i.e., semantic features). The features of the key frames may be then propagated to temporally subsequent or temporally previous non-key frames (i.e., $I_{i-1}$, $I_i$, $I_{i+1}$) in a frame-by-frame manner.

Optical flow may be used as guidance and bilinear interpolation may be adopted as a warping operator W. That is, predicted optical flows pairs of images, such as $[I_{i-1}, I_i]$ and $[I_i, I_{i+1}]$, output from the FlowNet 104 and the FlowNet 105 may be used to respectively propagate features toward the temporally next and previous non-key frame. For a non-key frame i, there are four estimated optical flows $[F_{i-1,i}^f, F_{i,i-1}^b, F_{i,i+1}^f, F_{i+1,i}^b]$ in which $F_{x,y}^f$ and $F_{y,x}^b$ respectively indicate a forward flow and a backward flow between pair of images $[I_x, I_y]$. FIG. 2 depicts the input frames and output optical flows generated by the FlowNets 104 and 105.

The four estimated optical flows may also be input into the occlusion network OccNet 108, as depicted in FIG. 3A, to estimate regions that may contain distortions due to occlusions during the propagation process. The propagated features may then be rectified under guidance of predicted occlusion maps $O_i^f$ and $O_i^b$ to correct any remaining slight distortions indicated by $1-O_i^f-O_i^b$ with the help of features extracted from the current frame using the SegNet$_{nk}$ 103, which is a relatively light-weight image-segmentation network in comparison to the SegNet$_k$ 101 and the SegNet$_k$ 102.

The bidirectional feature propagation disclosed herein takes advantage of two key frames instead of one key frame, as is traditionally done. Assuming a fixed distance D between the two key frames, key frames k and k+D may be respectively input into the image semantic-segmentation networks SegNet$_k$ 101 and SegNet$_{k+D}$ 102 to respectively obtain corresponding semantic-segmentation features $h_k$ and $h_{k+D}$. For the forward direction, the optical flow $F_{k+d,k+d+1}^f$, $d \in [0, D-1]$, may be calculated, or determined, and used to propagate $h_{k+d}$ to the temporally next frame with respect to key frame k. For the backward direction, the optical flow $F_{k+D-d,k+D-d-1}^b$, $d \in [0, D-1]$ may be determined and used to propagate $h_{k+D-d}$ to the temporally previous frame with respect to key frame k+D.

Figure 4:
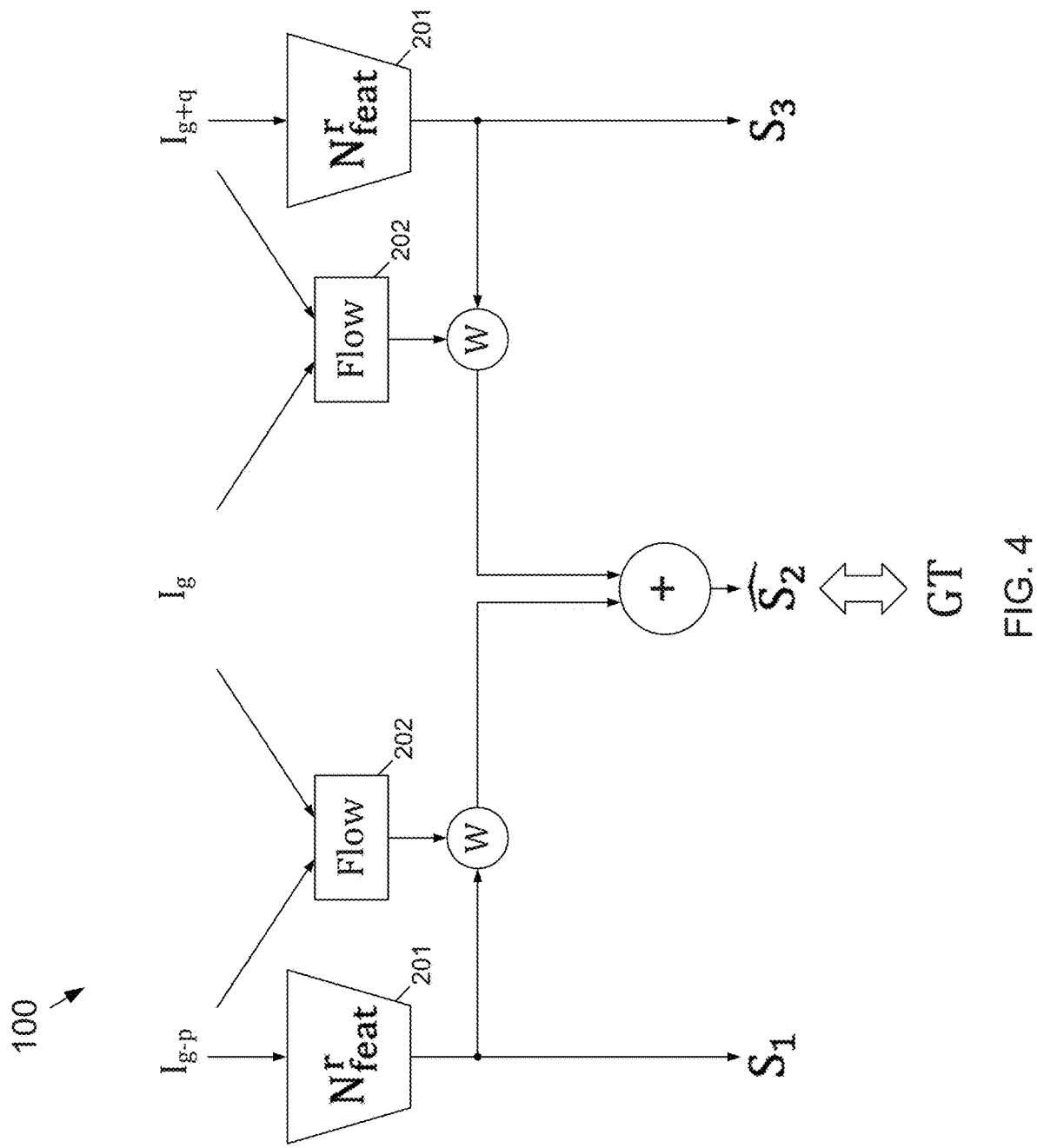
FIG. 4 depicts a training configuration of the semantic-segmentation propagation portion of the framework disclosed herein.

Supervised learning may be used to train the bidirectional semantic-segmentation portion of the framework 100. As depicted in FIG. 4, a batch of three images $[I_{g-p}, I_g, I_{g+q}]$ may be input into the semantic-segmentation propagation portion of the framework 100. The image $I_g$ includes the ground truth. The indices of the images in the batch may be generated based on the following equations:

$$1 \leq p \leq D, \quad (1)$$

and $$q = D - p + 1. \quad (2)$$

During training of the bidirectional semantic-segmentation portion of the framework 100, the framework may include two main semantic segmentation networks, i.e., image segmentation networks $N_{feat}^r$ 201 (which corresponds to both the SegNet$_k$ and SegNet$_{k+D}$ networks in FIG. 1) and a convolutional neural network (CNN) Flow network 202 (which corresponds to both the FlowNet 104 and the FlowNet 105 in FIG. 1). The network $N_{feat}^r$ may be pretrained on, for example, ImageNet and then finetuned on a particular segmentation dataset (e.g., Cityscapes). The CNN Flow 202 may be pretrained on, for example, a synthetic Flying Chairs dataset and then finetuned during training the bidirectional framework, while the network $N_{feat}^r$ remains fixed.

The $N_{feat}^r$ networks respectively output semantic-segmentations for $I_{g-p}$ and $I_{g+q}$ as $S_1$ and $S_2$. The outputs from the $N_{feat}^r$ and the Flow network 202 are operated on by Warp operators W and combined to form an estimated semantic segmentation as $\hat{S}_2$, which is compared to the ground truth GT.

An attention-based feature correction mechanism is used to fuse features from forward and backward directions with features extracted from a current frame based on the occlusion maps which are learned by an occlusion network taking into consideration of occlusion detection in both forward and backward directions. In some embodiments, the occlusion network may, for example, have a U-Net shape structure 350, as depicted in FIG. 3B, that takes four optical flows from three consecutive frames $[F_{i-1,i}^f, F_{i,i-1}^b, F_{i,i+1}^f, F_{i+1,i}^b]$ as inputs and estimates the occlusion maps $O_i^f$ and $O_i^b$. In FIG. 3B, the term "Conv2d" indicates a two-dimensional (2D) convolutional layer, "Concat" indicates a concatenation layer, and "Deconv" indicates a deconvolutional layer. And the numbers "8," "16," "32" and "64" in FIG. 3B indicate the number of channels after each convolutional layer. From the complementary optical flows, occlusion maps may be predicted in the forward direction $O_i^f$ in which the region of the frame i−1 becomes occluded in frame i, and in the backward direction $O_i^b$ in which the region of the frame i+1 becomes occluded in the frame i. Regions in which both forward and backward optical flows are uncertain about a classification may be ignored. A guidance map from the current frame $1-O_i^f-O_i^b$ may correct mistakes made by the features propagated from the either forward or backward directions.

Referring back to FIG. 1, one example framework 100 may include the first image sematic-segmentation network SegNet$_k$ 101, the second image sematic-segmentation network SegNet$_{k+D}$ 102, the third image semantic-segmentation network SegNet$_{nk}$ 103, the first optical FlowNet 104, a second optical FlowNet 105, the first warp operation W circuit 106, the second warp operation W circuit 107, the occlusion network OccNet 108, and the combining network 109. In one embodiment, the SegNet$_{nk}$ may include ten convolutional layers interlaced with batchnorm and Leaky Rectified Linear Unit (ReLU) layers for feature encoding and four deconvolutional layers interlaced with Leaky ReLU layers for feature decoding. The SegNet$_{nk}$ network may be trained separately on a particular segmentation dataset (e.g., Cityscapes). Then, OccNet 108 may be trained with the randomly initialized weights while SegNet$_k$, SegNet$_{k+D}$, the FlowNet network, and SegNet$_{nk}$ would remain fixed.

Let $h_i^f$ and $h_i^b$ respectively denote the propagated features from the key frame k and k+D to the current frame i, and let $h_i^c$ be the extracted feature from the current frame using SegNet$_{nk}$. The combining circuit 109 may adopt a weighted sum to perform feature rectification. Therefore:

$$h_i = h_i^f \times O_i^f + h_i^b \times O_i^i + h_i^c \times (1 - O_i^f - O_i^b) \quad (3)$$

in which "x" represents a spatially element-wise multiplication.

In one example embodiment of the framework 100, a DeepLabv3+ network may be used as a semantic-segmentation architecture for SegNet$_k$ and SegNet$_{k+D}$ networks based on performance in terms of accuracy and efficiency. In another example embodiment, a modified FlowNet2-S may be used as a CNN for the optical flow estimation network FlowNet.

The bidirectional feature-propagation framework 100 disclosed herein may be evaluated on, for example, the Cityscapes dataset, which is a popular dataset in semantic segmentation and autonomous driving domain. The training and validation sets contain 2975 and 500 video clips, respectively. Each video clip has 30 frames in which the 20th frame is annotated by pixel-level semantic labels having 19 categories.

Figure 5:
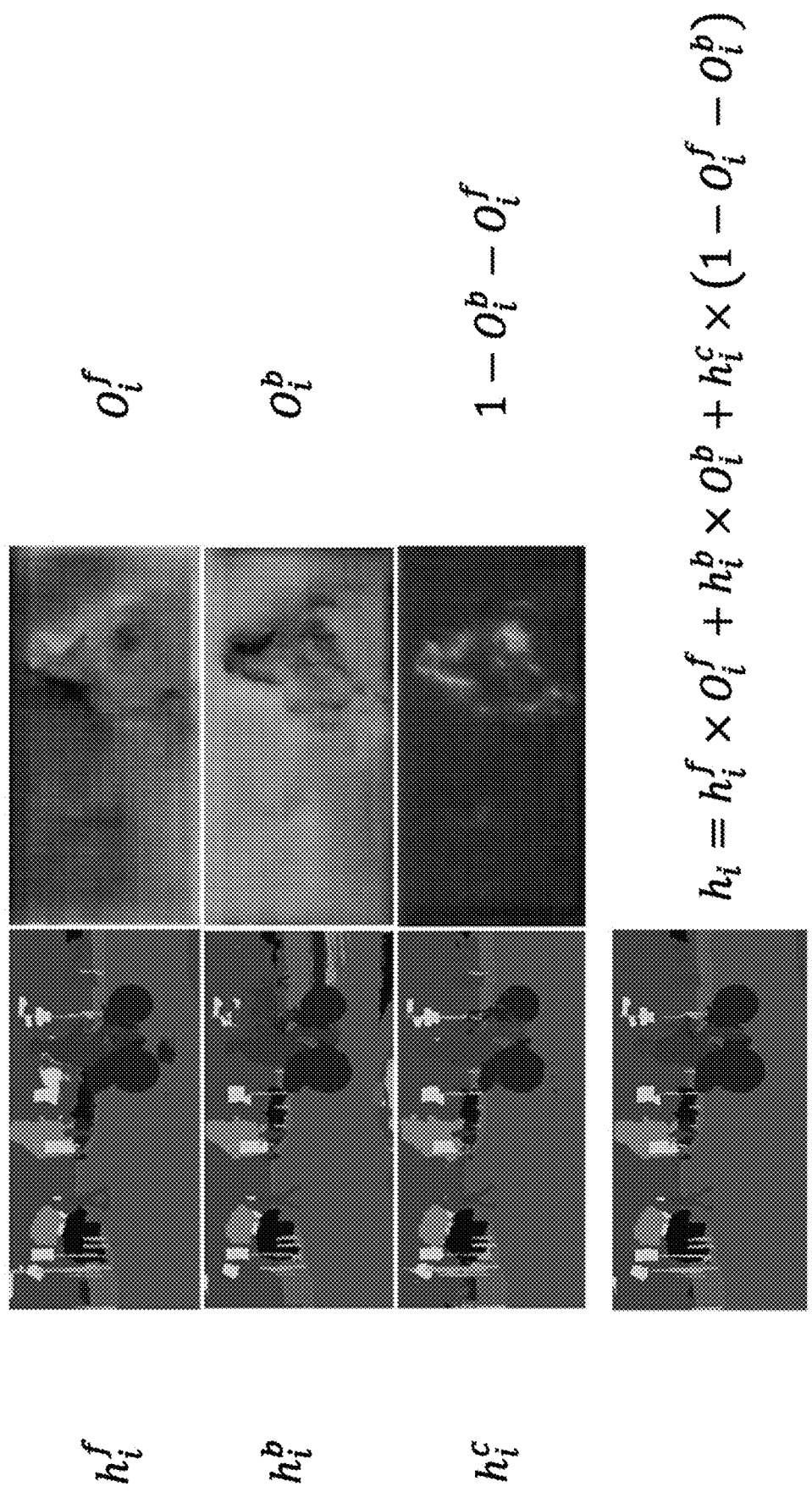
FIG. 5 shows example visual intermediate results for an example embodiment of the bidirectional feature-propagation framework according to the subject matter disclosed herein.

FIG. 5 shows example visual intermediate results for an example embodiment of the bidirectional feature-propagation framework 100 that includes propagated features in forward and backward directions ($h_i^f$ and $h_i^b$), feature extracted from the current frame ($h_i^c$), and occlusion maps ($O_i^f$, $O_i^b$, and $1-O_i^b-O_i^f$). It may be observed that the occlusion network disclosed herein is able to estimate occlusion maps for both forward and backward directions, and may highlight regions where both propagated features are uncertain about predictions and that may be used for refinement based on features of current frame.

Figure 6:
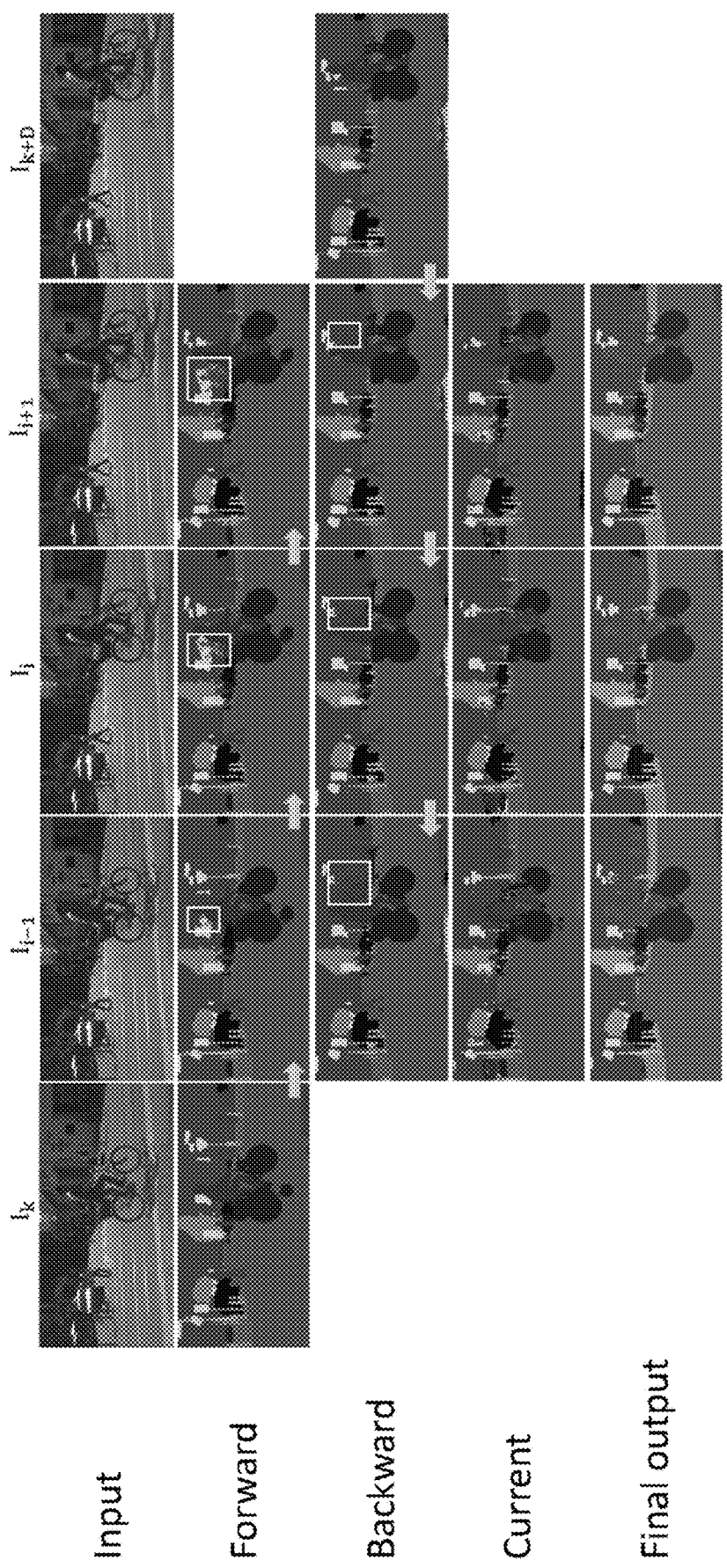
FIG. 6 shows example visual semantic-segmentation results for five sequences of three non-key video frames according to the subject matter disclosed herein.

FIG. 6 shows example visual semantic-segmentation results for five sequences of three (3) non-key video frames according to the subject matter disclosed herein. Frames indices are indicated at the top of FIG. 6. The top row of FIG. 6 shows the example input frames. The second row shows forward propagation results. The third row shows backward propagation results. The fourth row shows the current results, and the fifth row shows out the final output.

Performance of different video semantic-segmentation methods may evaluated by measuring the segmentation accuracy using Mean Intersection Over Union (mIoU) and mIoU based temporal consistency (mTC). Table 1 shows performance of an example embodiment of the bidirectional feature-propagation framework disclosed herein in comparison to traditional key frame-based techniques including DFF, Accel, and Distortion-Aware Video Semantic Segmentation (DAVSS). In Table 1, the bidirectional propagation framework disclosed herein appears in the bottom two rows. In the top of the bottom two rows, the bidirectional propagation framework adopts a DeeplabV3+ network as $SegNet_k$ and $SegNet_{k+D}$, and in the bottom of the two rows, the bidirectional propagation framework adopts a HRNetV2 network as $SegNet_k$ and $SegNet_{k+D}$. The propagation distance D is set to 5 for both example embodiments. It may be observed that the bidirectional propagation framework disclosed herein outperforms the other methods in terms of mTC and has a comparable mIoU value with a favorable computational burden in GFLOPs.

TABLE 1

Evaluation based on Cityscapes and CamVid datasets.

| Method | Citiscapes | | | CamVid | | |
|---|---|---|---|---|---|---|
| | mIoU | mTC | GFLOPs | mIoU | mTC | GFLOPs |
| DeeplabV3+ | 76.6 | 76.6 | 820 | 72.0 | 83.2 | 270 |
| HRNetV2 | 75.9 | 81.0 | 156 | 75.0 | 83.9 | 52 |
| GRFP | 76.6 | 83.8 | 468 | 74.6 | 87.2 | 156 |
| TDNet | 76.5 | 81.6 | 161 | 72.6 | 84.7 | 54 |
| DFF | 68.7 | — | 180 | 66.0 | — | 60 |
| Accel | 72.1 | — | 510 | 66.7 | — | 170 |
| DAVSS | 75.4 | 84.5 | 212 | 71.1 | 85.0 | 72 |
| BIDIR (DeeplabV3+) | 76.5 | 83.9 | 231 | 71.8 | 84.1 | 78 |
| BIDIR (HRNetV2) | 75.7 | 86.5 | 231 | 74.4 | 88.4 | 78 |

Figure 7:
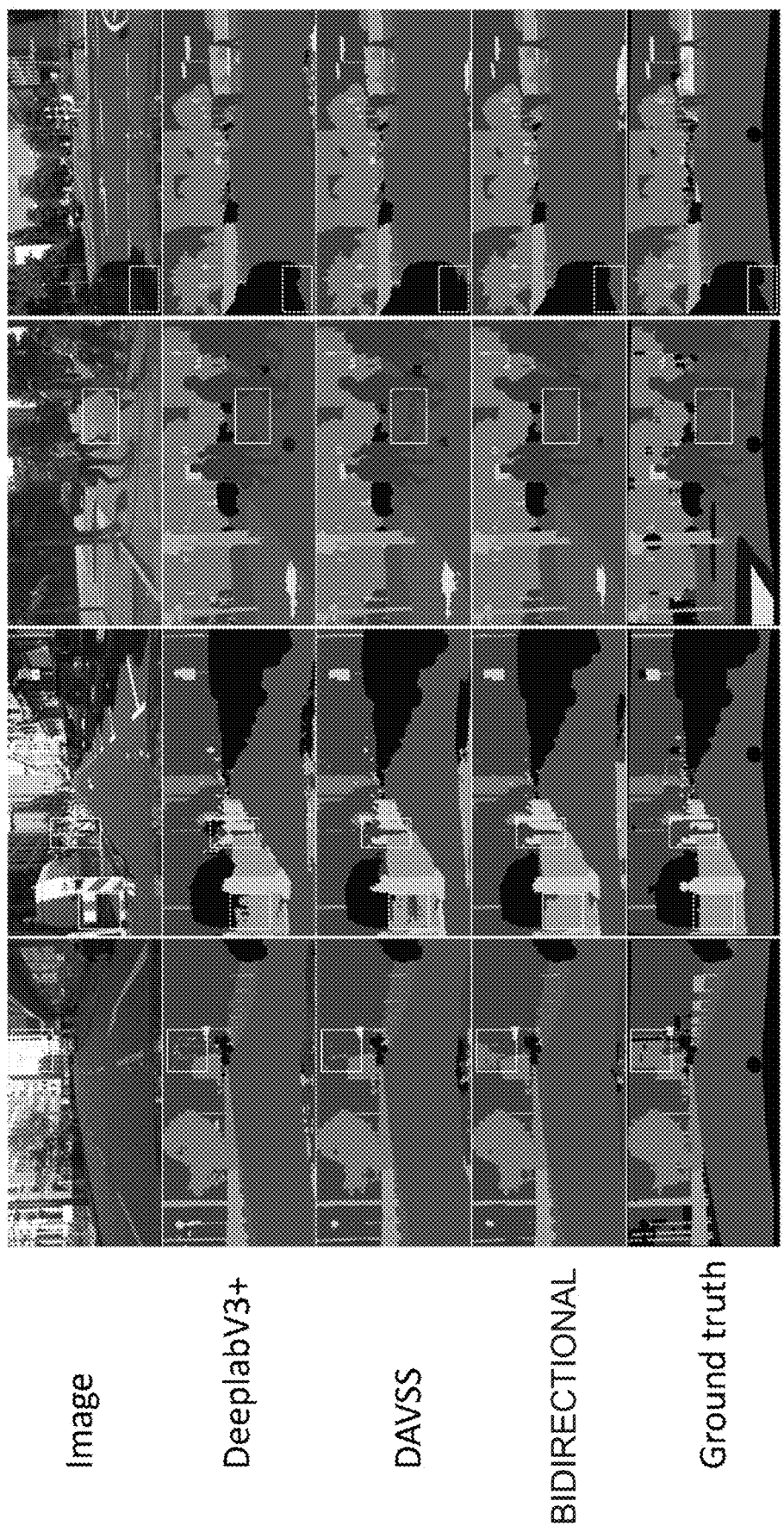
FIG. 7 shows a comparison of example visual results for different semantic-segmentation techniques in comparison to the semantic-segmentation with bidirectional feature propagation and attention based feature correction technique disclosed herein.

FIG. 7 shows a comparison of example visual results for different semantic-segmentation techniques in comparison to the semantic-segmentation with bidirectional feature propagation and attention based feature correction technique disclosed herein. The top row in FIG. 7 shows four example frames. The second row shows results for each respective example frame provided by a DeeplabV3+ network. The third row shows results provided by a DAVSS network. The fourth row shows results provided by the semantic-segmentation with bidirectional feature propagation and attention-based feature correction technique disclosed herein. The fifth row shows the ground truth for the four example frames.

Figure 8:
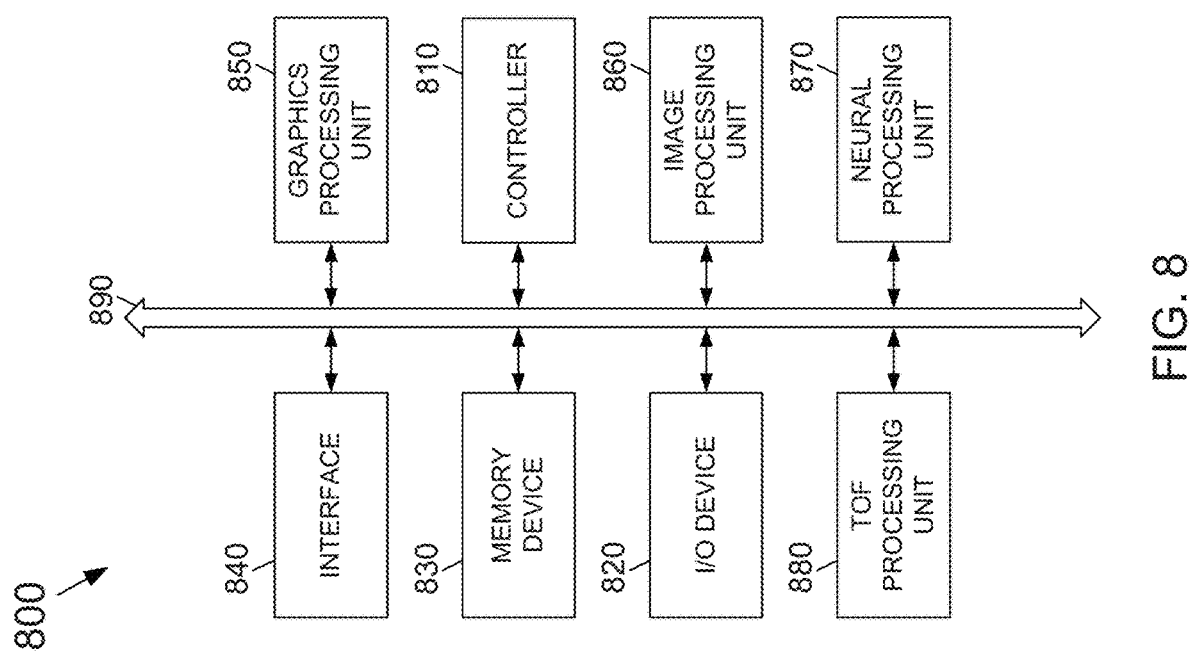
FIG. 8 depicts an electronic device that in one embodiment may include a video semantic-segmentation system that uses bidirectional feature propagation and attention-based feature correction according to the subject matter disclosed herein.

FIG. 8 depicts an electronic device 800 that in one embodiment may include a video semantic-segmentation system that uses bidirectional feature propagation and attention-based feature correction according to the subject matter disclosed herein. Electronic device 800 and the various system components of electronic device 800 may be formed from one or more modules. The electronic device 800 may include a controller (or CPU) 810, an input/output device 820 such as, but not limited to, a keypad, a keyboard, a display, a touch-screen display, a 2D image sensor, a 3D image sensor, a memory 830, an interface 840, a GPU 850, an imaging-processing unit 860, a neural processing unit 870, a TOF processing unit 880 that are coupled to each other through a bus 890. The controller 810 may include, for example, at least one microprocessor, at least one digital signal processor, at least one microcontroller, or the like. The memory 830 may be configured to store a command code to be used by the controller 810 and/or to store a user data.

In one embodiment, the image processing unit 860 may include a video semantic-segmentation system that uses bidirectional feature propagation and attention-based feature correction according to the subject matter disclosed herein. In another embodiment, the neural processing unit 870 may be part of a video semantic-segmentation system that uses bidirectional feature propagation and attention-based feature correction according to the subject matter disclosed herein.

The interface 840 may be configured to include a wireless interface that is configured to transmit data to or receive data from, for example, a wireless communication network using a RF signal. The wireless interface 840 may also include, for example, an antenna. The electronic system 800 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to provide video semantic segmentation, the method comprising:
    semantically segmenting, by a first image semantic-segmentation network, a first frame of a sequence of video frames to obtain at least one first semantic feature of the first frame;
    semantically segmenting, by a second image semantic-segmentation network, a second frame of the sequence of video frames to obtain at least one second semantic feature of the second frame, the second frame being subsequent to the first frame;
    semantically segmenting, by a third image semantic-segmentation network, a third frame of the sequence of video frames to obtain at least one third semantic feature of the third frame, the third frame being subsequent to both the first frame and the second frame according to a predetermined number of consecutive frames; and
    generating, by a combining network, at least one fourth semantic feature of the second frame based on the at least one first semantic feature, the at least one second semantic feature and the at least one third semantic feature.

2. The method of claim 1, wherein the predetermined number of consecutive frames comprises a fixed number of multiple consecutive frames; and
    wherein the first frame is at a beginning of the fixed number of multiple consecutive frames, and
    wherein the third frame is at an end of the fixed number of multiple consecutive frames,
    wherein the second frame comprises a single frame in a middle of the fixed number of multiple consecutive frames between the first frame and the third frame, and
    wherein the first frame and the third frame comprise key frames.

3. The method of claim 1, wherein the first image semantic-segmentation network comprises a deeper neural network than the second image semantic-segmentation network, and
    wherein the third image semantic-segmentation network comprises a neural network that is deeper than the second image semantic-segmentation network.

4. The method of claim 1, further comprising:
    propagating the at least one first semantic feature toward the second frame in a frame-by-frame manner to obtain at least one first propagated semantic feature; and propagating the at least one third semantic feature toward the second frame in a frame-by-frame manner to obtain at least one second propagated semantic feature.

5. The method of claim 1, further comprising:
determining, by a first optical flow network, at least one first forward optical flow from a fourth frame of the sequence of video frames to the second frame and at least one first backward optical flow from the second frame to the fourth frame, the fourth frame being between the first frame and the second frame, and the fourth frame being immediately consecutive to the second frame; and
determining, by a second optical flow network, at least one second forward optical flow from the second frame to a fifth frame of the sequence of video frames and at least one second backward optical flow from the fifth frame to the second frame, the fifth frame being between the second frame and the third frame, and the fifth frame being immediately consecutive to the second frame.

6. The method of claim 5, further comprising:
propagating the at least one first semantic feature toward the second frame in a frame-by-frame manner to obtain at least one first propagated semantic feature;
propagating the at least one third semantic feature toward the second frame in a frame-by-frame manner to obtain at least one second propagated semantic feature;
determining, by a first occlusion network, at least one first occlusion map from the fourth frame to the second frame and at least one second occlusion map from the fifth frame to the second frame based, at least in part, on the at least one first forward optical flow, the at least one first backward optical flow, the at least one second forward optical flow and the at least one second backward optical flow; and
generating at least one third occlusion map for the second frame based on the at least one first occlusion map and the at least one second occlusion map.

7. The method of claim 6, further comprising generating, by the combining network, a semantically segmented frame for the second frame based on the at least one first propagated semantic feature and the at least one first occlusion map, the at least one second propagated semantic feature and the at least one second occlusion map, and the at least one second semantic feature for the second frame and at least one third occlusion map for the second frame, by
multiplying by element-wise multiplication the at least one first propagated semantic feature and the at least one first occlusion map to obtain at least one first weighted semantic feature;
multiplying by element-wise multiplication the at least one second propagated semantic feature and the at least one second occlusion map to obtain at least one second weighted semantic feature;
multiplying by element-wise multiplication the at least one second semantic feature and at least one third occlusion map to obtain at least one third weighted semantic feature; and
multiplying by element-wise summation the at least one first weighted semantic feature, the at least one second weighted semantic feature and the at least one third weighted semantic feature.

8. A system to provide video semantic segmentation, the system comprising:
a first semantic-segmentation network configured to semantically segment a first frame of a predetermined number of consecutive video frames to obtain at least one first semantic feature of the first frame;
a second semantic-segmentation network configured to semantically segment a second frame of the sequence of video frames to obtain at least one second semantic feature of the second frame, the second frame being subsequent to the first frame;
a third semantic-segmentation network configured to semantically segment a third frame of the sequence of video frames to obtain at least one third semantic feature of the third frame, the third frame being subsequent to the second frame and also being subsequent to the first frame by a first predetermined number of consecutive frames; and
a combining network configured to generate at least one fourth semantic feature of the second frame based on the at least one first semantic feature, the at least one second semantic feature and the at least one third semantic feature.

9. The system of claim 8, wherein the predetermined number of consecutive video frames comprise a fixed number of consecutive video frames,
wherein the first frame is at a beginning of the fixed number of consecutive video frames,
wherein the third frame is at an end of the fixed number of consecutive video frames,
wherein the second frame comprises a single frame in a middle of the fixed number of consecutive video frames between the first frame and the third frame, and
wherein the first frame and the third frame comprise key frames.

10. The system of claim 8, wherein the system is further configured to:
propagate the at least one first semantic feature toward the second frame in a frame-by-frame manner to obtain at least one first propagated semantic feature; and
propagate the at least one third semantic feature toward the second frame in a frame-by-frame manner to obtain at least one second propagated semantic feature.

11. The system of claim 8, further comprising:
a first optical flow network configured to determine at least one first forward optical flow from a fourth frame to the second frame and at least one first backward optical flow from the second frame to the fourth frame, the fourth frame being between the first frame and the second frame, and the fourth frame being immediately consecutive to the second frame; and
a second optical flow network configured to determine at least one second forward optical flow from the second frame to a fifth frame and at least one second backward optical flow from the fifth frame to the second frame, the fifth frame being between the second frame and the third frame, and the fifth frame being immediately consecutive to the second frame.

12. The system of claim 11, further comprising:
a first occlusion network configured to determine at least one first occlusion map from the fourth frame to the second frame and at least one second occlusion map from the fifth frame to the second frame based, at least in part, on the at least one first forward optical flow, the at least one first backward optical flow, the at least one second forward optical flow and the at least one second backward optical flow, and
wherein the combining network is further configured to generate at least one third occlusion map for the second frame based on the at least one first occlusion map and the at least one second occlusion map.

13. The system of claim 12, wherein the system is further configured to:
   propagate the at least one first semantic feature toward the second frame in a frame-by-frame manner to obtain at least one first propagated semantic feature; and
   propagate the at least one third semantic feature toward the second frame in a frame-by-frame manner to obtain at least one second propagated semantic feature, and
   wherein the combining network is further configured to generate a semantically segmented frame for the second frame based on the at least one first propagated semantic feature and the at least one first occlusion map, the at least one second propagated semantic feature and the at least one second occlusion map, and the at least one second semantic feature for the second frame and at least one third occlusion map for the second frame by:
   multiplying by element-wise multiplication the at least one first propagated semantic feature and the at least one first occlusion map to obtain at least one first weighted semantic feature;
   multiplying by element-wise multiplication the at least one second propagated semantic feature and the at least one second occlusion map to obtain at least one second weighted semantic feature;
   multiplying by element-wise multiplication the at least one second semantic feature and at least one third occlusion map to obtain at least one third weighted semantic feature; and
   multiplying by element-wise summation the at least one first weighted semantic feature, the at least one second weighted semantic feature and the at least one third weighted semantic feature.

* * * * *